(12) United States Patent
Graeff

(10) Patent No.: US 6,488,434 B1
(45) Date of Patent: Dec. 3, 2002

(54) OVERLOAD INDICATOR

(75) Inventor: Kurt R. Graeff, Windsor, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 7 days.

(21) Appl. No.: 09/651,198

(22) Filed: Aug. 30, 2000

(51) Int. Cl.[7] .................................. F16D 9/00
(52) U.S. Cl. .................. 403/2; 403/41; 403/DIG. 3; 403/315
(58) Field of Search ................ 403/2, 27, 41, 403/338, 335, 315–319, 79, 11, 16, DIG. 3; 464/32, 33; 411/4, 916

(56) References Cited

U.S. PATENT DOCUMENTS

| | | |
|---|---|---|
| 3,185,415 A | 5/1965 | Thorn |
| 3,675,282 A | 7/1972 | Summers et al. |
| 4,330,926 A | 5/1982 | McCall |
| 4,755,632 A | 7/1988 | Pelet et al. |
| 4,846,769 A | 7/1989 | Allen |
| 5,122,007 A | 6/1992 | Smith |
| 5,466,082 A | 11/1995 | Sherar |
| 5,599,129 A | 2/1997 | Clifton et al. |
| 5,895,892 A | 4/1999 | Braun |
| 6,007,267 A | 12/1999 | VanHorn |

*Primary Examiner*—Lynne H. Browne
*Assistant Examiner*—Victor L MacArthur

(57) ABSTRACT

An overload indicator apparatus (10) is provided for use in connection with a force generator (12). The force generator is used to apply a force to a load (14), and the overload indicator will indicate if the applied force is greater than a predetermined amount. The overload indicator includes a first support member (16), a second support member (18), and a tensile member (20). The first support member can be connected to the force generator, and the second support member can be connected to the load. The tensile member is positioned between, and in load bearing communication with, the first support member and the second support member, and is adapted to support at least part of the force when the force is less than substantially the predetermined amount. An overload retainer (40) comprises at least one beam (42), the beam having a first end (30) connected to the first support member and a second end (32) connected to the second support member. The beam is adapted to support at least part of the force when the force is greater than substantially the predetermined amount. An indicator means (86) indicates that the force applied to the load is greater than substantially the predetermined amount.

16 Claims, 5 Drawing Sheets

OVERLOAD INDICATOR

BACKGROUND

This invention relates to an overload indicator or mechanical fuse that can be used to determine if a force level has exceeded an acceptable predetermined amount of force. More particularly, this invention relates to an overload indicator or mechanical fuse with an overload retainer that maintains a connection between a force generator and a load after an overload event occurs.

An overload indicator or mechanical fuse typically includes a low cost component that can be sacrificed to prevent damage to more costly components. By way of example, a shear pin can be used to connect a propeller to a drive shaft on an outboard motor. If the propeller strikes an obstruction, the shear pin can break to prevent damage to the motor's drive train. Shear pins are usually mounted with their longitudinal axis oriented in a direction transverse to the applied load. Devices that use shear pins are disclosed in at least three United States Patents, including U.S. Pat. No. 5,122,007 to Smith, U.S. Pat. No. 4,330,926 to McCall, and U.S. Pat. No. 5,466,082 to Shearer.

Overload indicators or mechanical fuses can also use sacrificial components which have a longitudinal axis oriented in the direction of the applied force. For example, a mechanical fuse can be interposed between a helicopter and a load carried by a cable depending from the helicopter. If the load strikes an object, the mechanical fuse can break, thereby releasing the load to avoid damage to, or even the destruction of, the helicopter. Examples of longitudinally mounted mechanical fuses are disclosed in at least two United States patents, including U.S. Pat. No. 5,599,129 to Clifton and U.S. Pat. No. 6,007,267 to VanHom. Additional mechanical fuse type devices are disclosed in U.S. Pat. No. 3,675,282 to Summers et al, U.S. Pat. No. 4,846,769 to Allen, U.S. Pat. No. 5,895,892 to Braun, U.S. Pat. No. 4,755,632 to Pelet et al, and U.S. Pat. No. 3,185,415 to Walker.

In some applications, an operator may not be aware that an overload situation has occurred until the mechanical fuse fractures, severing the connection between the force generator and the load. This approach may prevent damage to the force generating mechanism at the possible expense of destroying the load, or vice versa. Depending upon the cost of the item that is damaged or destroyed, this may not be a desirable result. This result can also be undesirable if the item that is suddenly unconstrained, subsequent to the fracture of the mechanical fuse, is free to impact adjacent structures or personnel or fall into areas where retrieval will be difficult or impossible.

SUMMARY

According to one aspect of the invention, an overload indicator apparatus is provided for use in connection with a force generator. The force generator is used to apply a force to a load via the overload indicator, and the overload indicator maintains a connection between the force generator and the load while indicating whether force applied to the load is greater than a predetermined acceptable amount of force.

The overload indicator includes a first support or plate member, a second support or plate member spaced away from the first plate member, and a tensile member. The first support member can be connected to the force generator, and the second support member can be connected to the load. The tensile member can be positioned between, and in load bearing communication with, the first support member and the second support member, and is adapted to support at least part of the force when the force is less than substantially the predetermined amount.

The overload indicator further includes an overload retainer comprising at least one beam, the beam having a first end connected to the first support member and a second end connected to the second support member. The beam is adapted to support at least part of the force when the force is greater than substantially the predetermined amount of force.

An indicator means indicates that the force applied to the load is greater than substantially a predetermined acceptable amount of force. A variety of indicator means may be used. For example, the indicator means may be visual, and can comprise the tensile member, the first support member, the second support member, an electronic switch connected to a visual output device, or a combination of these members. The indicator means may also be audible, comprising the tensile member, an electronic switch connected to an audible output device, or a combination of these elements.

An example of an indicating means that can be both visual and audible is the tensile member. The tensile member can be selected to break when the force is greater than substantially the predetermined amount of force. The tensile member can break with an audible "pop" to alert the user that an overload situation has occurred. Moreover, even if the "pop" is not audible, a visual examination of the tensile member can still reveal the break. The tensile member can include a weakened portion, such as the middle portion between the first and second support members, that is adapted to break at a specific position. The tensile member can be removably connected to one or both of the first and second support members, which permits relatively easy replacement of broken tensile members and also the selection and use of various tensile members corresponding to the desired predetermined acceptable amounts of force.

For example, a first fastener can releasably secure the first tensile end to the first support member, the first fastener being removable from a first exposed side of the first support member. Likewise, a second fastener can releasably secure the second tensile end to the second support member, the second fastener being removable from a second exposed side of the second support member. In such an arrangement, when the first fastener and the second fastener are removed, the tensile member can be removed from the first support member and the second support member without having to first disassemble the support members and overload retainer.

Either the first or second support members, or both, can be moveably connected to the ends of the beam in the overload retainer. The far ends of the beam can each have a stop member. When the force is less than substantially the predetermined amount of force, a support plate member that is moveably connected to the beam will be in an underload position, and when the force is greater than substantially the predetermined amount of force, such support member will move to an overload position. In the overload position, such support member is closer to the stop member than when in the underload position. A force absorber may be positioned between the support member and the stop member to limit impact loads that would otherwise occur between such support plate member and a stop member. The support members compress the force absorbers when moving into the overload position, and the stop members retain the force absorbers and support members on the beam.

Either or both of the support members can comprise a visual overload indicating means, since the user of the apparatus can determine if an overload situation has occurred by visually ascertaining whether the support members are in an underload or overload position. The support members can also comprise an audible indicating means.

DETAILED DESCRIPTION

Figure 1:
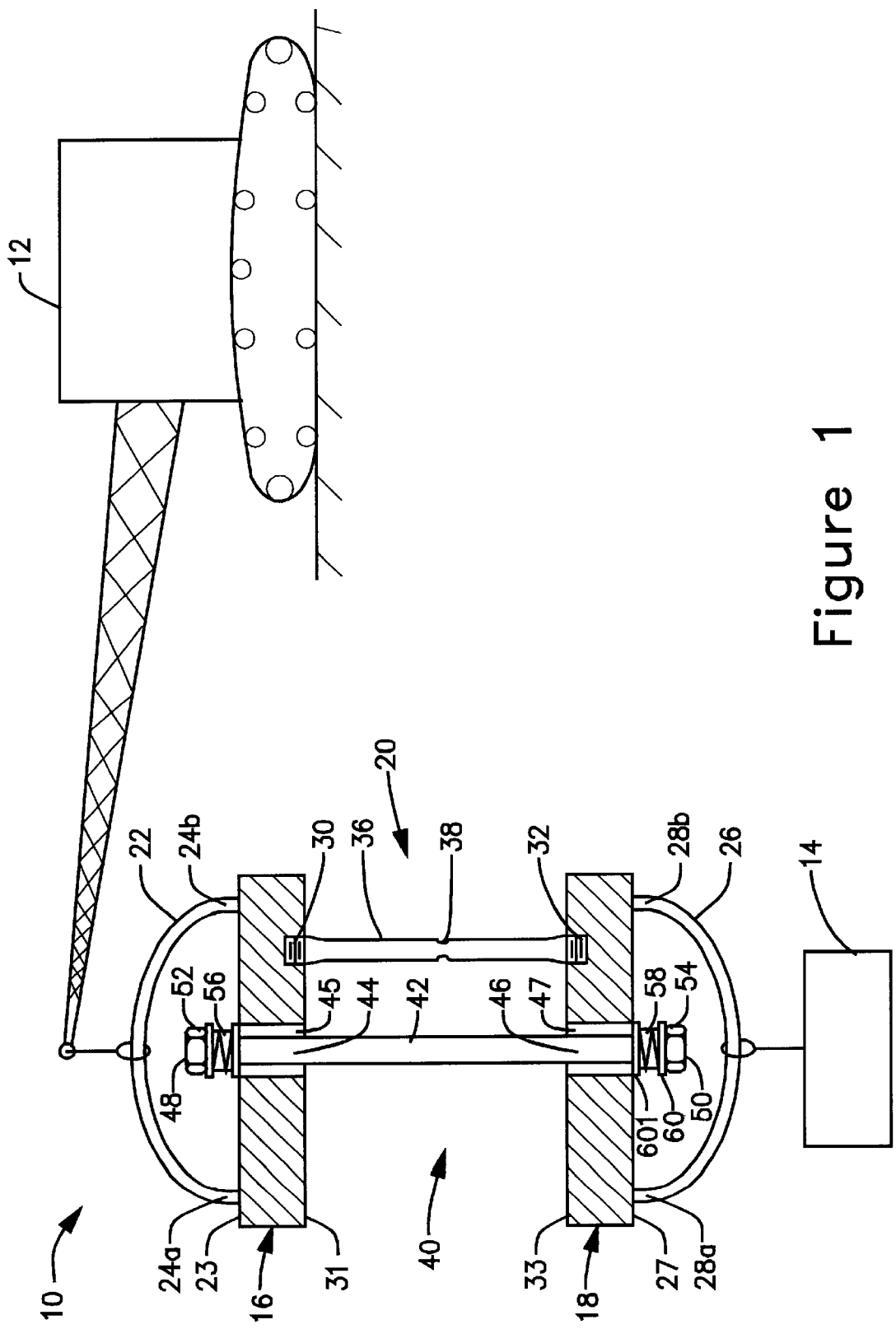
FIG. 1 is a front elevation view, in partial cross section, of apparatus in which the overload retainer has one beam.

FIG. 1 shows an overload indicator (10) having features found on the present invention, for use in connection with a force generator (12) used to apply a force to a load (14). The force generator can be a variety of devices known to skilled artisans, such as a crane, hoist, or the like. The overload indicator (10) is used to transfer forces from the force generator to the load (14), and to indicate whether the force applied to the load is greater than a predetermined acceptable amount. In some applications, the force may be applied to the load without expectation that the load will be moved.

A first support plate member (16) is connectable to the force generator (12). A second support plate member (18) is spaced away from the first plate member and is connectable to the load (14). A tensile member (20) can have a cylindrical cross section and be positioned between, and in load bearing communication with, the first support member and the second support member to support the force applied to the load by the force generator. The tensile members described herein are positioned to support loads applied substantially in the direction of their longitudinal axis, i.e., in the direction extending between the first support plate and the second support plate. The tensile members reside in the open space between the support plates. Consequently, they are not contained within enclosures that could muffle audible indications of an overload event, such as the sound of the tensile member breaking.

The first plate (16) includes a first connection or attachment fixture (22) affixed to outer surface (23). The first attachment fixture can be, for example, a handle type device as shown with two connection points (24a) and (24b), an eyelet with one connection point (see FIG. 3), or the like. A second connection or attachment fixture (26) is affixed to an outer surface (27) of the second support member. The second attachment fixture can also be a handle type device as shown with two connection points (28a) and (28b), an eyelet with one connection point or the like.

The first attachment fixture (22) is shown connected to the force generator (12) in FIG. 1. A skilled artisan will recognize that the first fixture can also be adapted to connect to the load (14), and or both the load and the force generator. Likewise, the second attachment fixture (26) is shown connected to the load (14), but it can also be adapted to connect to the force generator (12), and or both the force generator and the load. Consequently, even though embodiments described herein may refer to the first support plate being connected to the force generator, and the second support plate being connected to the load, it is to be understood that such embodiments include arrangements wherein the second support plate is connected to the force generator and the first support plate is connected to the load.

The tensile member (20) is positioned between the first plate member (16) and the second plate member (18). The tensile member has a first tensile end (30) connected to an inner surface (31) of the first plate member and a second tensile end (32) connected to an inner surface (33) of the second plate member. The tensile ends are preferably removably connected to the plate members. For example, as shown in FIG. 1, the tensile member ends can be threaded and screwed into tapped holes. Alternatively, the tensile member may be permanently jointed to the support plate members. Moreover, one tensile end might be permanently joined to one plate member and the opposite tensile end removably connected to the other plate member.

The tensile member (20) includes a middle portion (36) which can be positioned in between the first and second tensile ends (30) and (32), as well as between the first and second plate members (16) and (18). The size and material of the tensile member (20) are selected to enable the tensile member to support at least part of the force applied to the first attachment fixture (22) by the force generator (12), up to a predetermined acceptable amount of force. If the force applied by the force generator exceeds the predetermined acceptable amount, the tensile member (20) will fracture or break. In order to facilitate a controlled break, the middle portion (36) includes a weakened or break portion (38). The break portion can consist of a reduced cross sectional area, a notch, or the like.

Alternatively, the tensile member (20) can be made to withstand a higher amount of force than the predetermined acceptable amount, while one or both of the support plates are designed to fracture or break when the force exceeds the predetermined amount. By way of example, one of the support plates (16) and (18) can be designed so that one of the tensile ends (30) and (32) will pull out of the support plate when the force exceeds the predetermined amount.

The overload retainer (40) comprises a beam (42) with a first end (44) connected to the first support plate (16). The first end (44) extends through the hole (45) in the first support plate, the hole being of a sufficient size to provide a moveable or slideable connection between the first support plate and the beam. The beam (42) also includes a second end (46) connected to the second support plate (18). The second end (46) extends through the hole (47) in the second support plate, the hole being of a sufficient size to provide a moveable or slideable connection between the second support plate and the beam.

The first end (44) of the beam (42) terminates at a first far end (48) spaced a desired distance from outer surface (23) of the first plate member. The second end (46) of the beam terminates at a second far end (50) spaced a desired distance from outer surface (27) of the second plate member. The first far end includes a first stop member (52), and the second far end (50) includes a second stop member (54). The stop members can be, for example, nuts screwed onto the far ends, which may be threaded.

A first force or shock absorber (56) is positioned between the first stop member (52) and the outer surface (23) of the first plate member. A second force or shock absorber (58) is positioned between the second stop member (54) and the outer surface (27) of the second support plate. Washers (60) can be positioned between the stop members and the force absorbers, and between the force absorbers and the outer surfaces (23) and (27). The force absorbers can be any desired type of force or shock absorption material known to skilled artisans, including, for example, springs, compressible grommets, crushable honeycomb materials, and the like.

The tensile member (20) will support up to a predetermined amount of force, and will fracture or break when the force exceeds or is greater than the predetermined acceptable amount. As long as the force applied to the overload indicator (10) is below a predetermined amount, the overload retainer beam (42) will support a negligible fraction, if any, of the force because of the slideable nature of the connections between the beam and support or plate members (16) and (18). However, as subsequently described in greater detail, the overload retainer (40) will support the force when the force is greater than the predetermined amount. Consequently, the beam (42) is constructed with materials and dimensions necessary to support forces in excess of the predetermined acceptable amount.

Figure 2:
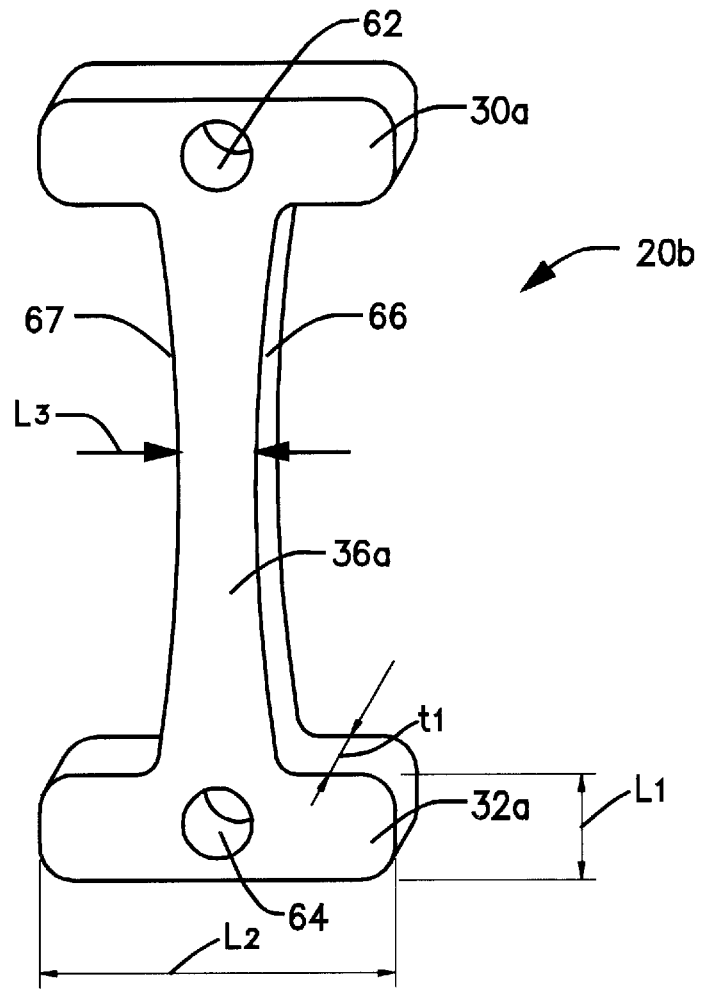
FIG. 2 is a perspective view of an alternative embodiment of a tensile member.

FIG. 2 shows an alternative embodiment of a tensile member (20b) having features found on the present invention. The tensile member includes oppositely disposed first and second tensile ends (30a) and (32a) that can be mirror images of each other. As shown with respect to second end (32a), the ends have a first length dimension (L1) and a second length dimension (L2). The first and second tensile ends (30a) and (32a) include apertures (62) and (64) respectively, and the middle portion (36a) includes edges (66) and (67) with a thickness (t1) and a width (L3).

Figure 4:
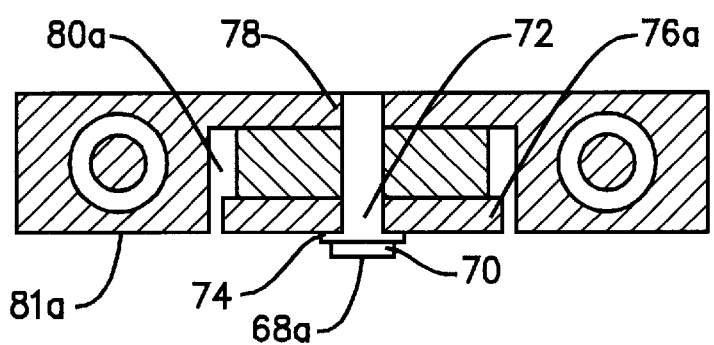
FIG. 4 is a top cross section view of the embodiment shown in FIG. 3.
Figure 3:
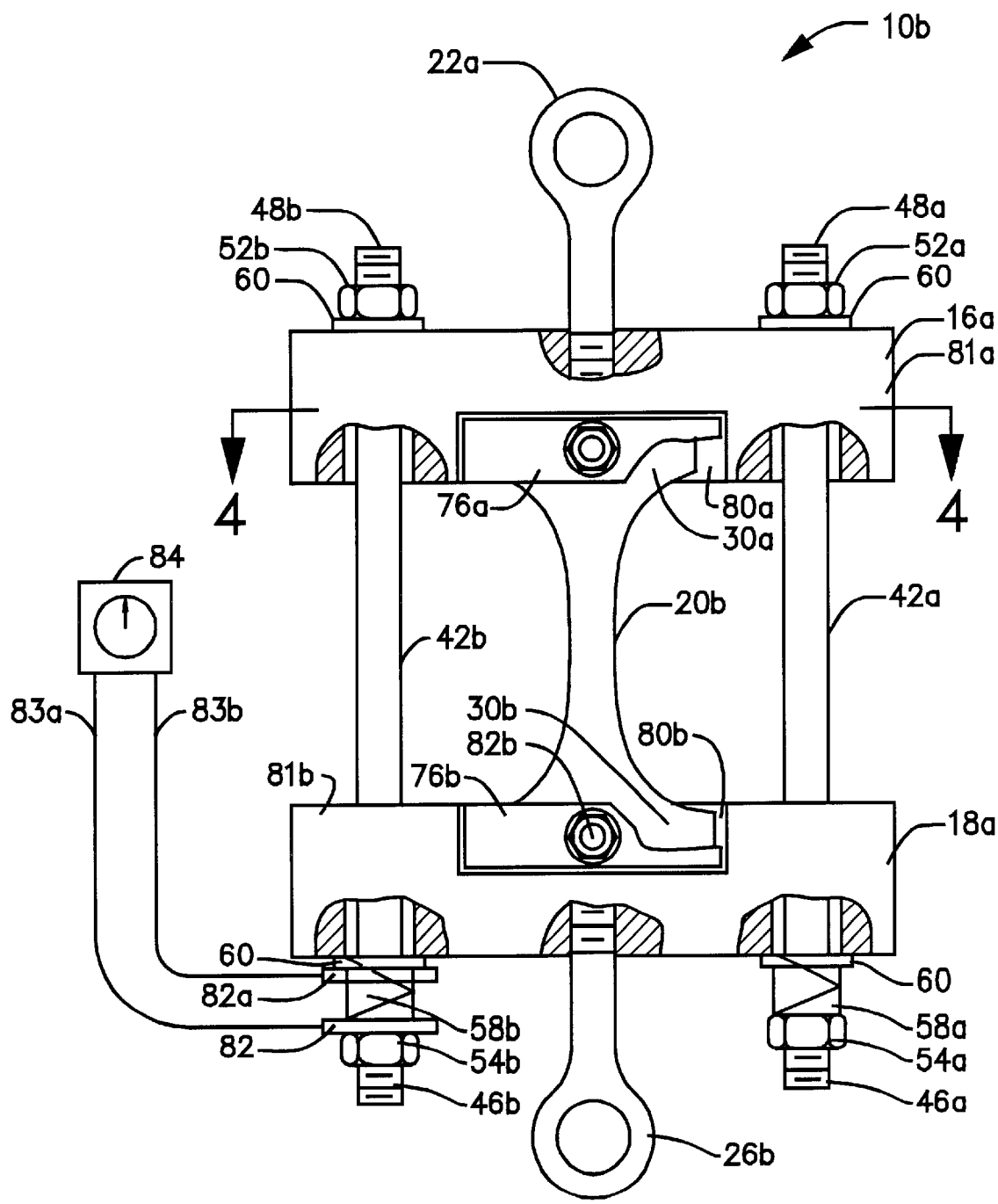
FIG. 3 is a front elevation view, shown in partial cross section, of an overload indicator utilizing the tensile member shown in FIG. 2.

FIGS. 3 and 4 show an overload indicator (10b), having features found on the present invention and which utilizes the tensile member (20b) shown in FIG. 2. The overload retainer includes a pair of beams (42a) and (42b) whose opposite ends are slideably or moveably connected to first plate (16a) and second plate (18a). The first far ends of the beams (48a) and (48b) can be threaded and equipped with nut stop members (52a) and (52b). The nuts are adjacent washers (60), which are mounted against the upper plate (16a).

The second far ends (46a) and (46b) of the beams can be threaded and equipped with nut stop members (54a) and (54b). Force absorbers (58a) and (58b) are interposed between the stop members and washers (60), which are mounted adjacent lower plate (18a).

First and second attachment fixtures (22a) and (26a), in the form of eyelets, have an end anchored in the first and second support plates (16a) and (18a), respectively. They can be attached to a force generator and a load in a manner similar to that shown in FIG. 1.

A bolt (68a), having a head (70) and shaft (72) can be used to releasably secure or connect the tensile member (20b) to the first support plate (16a). The shaft extends through a washer (60), retaining wall (76a), aperture (62), and the first support plate (16a). A portion (78) of the support plate is tapped with threads so that the bolt (68) can be screwed into and retained by the support plate. The first end (30a) of tensile member (20b) is nestled into cavity (80a) and is captured within the cavity by retaining wall (76a). The same mounting arrangement and hardware can be used at the opposite end of the tensile member, with second end (32a) nestled within cavity (80b) and captured within the cavity by bolt (68b) and retaining wall (76b).

As shown in the arrangement of FIG. 3, bolts (68a) and (68b) can be removed from the first and second support plate members (16a) and (18a) by accessing the heads of the bolts with a tool such as a wrench or a screwdriver (not shown). Since access is available from exposed sides (81a) and (81b) of the support plate members, the tensile member (20b) can be removed and replaced without having to disassemble the support plates from beams (42a) and (42b).

Tensile member (20b) has a material and dimensions (t1) and (L3) sufficient to support or withstand a predetermined acceptable level of force. If the force exceeds or is greater than this amount, then the tensile member can break and the force will be supported by the beams (42a) and (42b). Tensile member sides (66) and (67) can be constructed with a concave arcuate configuration as shown to provide a weakened middle portion that will break.

An electronic switch (82) having contact plates (82a) and (82b) can be positioned on one or more of the overload retainer's beam's far ends, such as far end (46b). The contact plates are connected to an audible or visual output device such as, for example, an alarm, a light, or a dial indicator. The output device can be powered by, for example, a separate power supply (not shown) or a piezoelectric device (not shown) incorporated into the switch.

Figure 5:
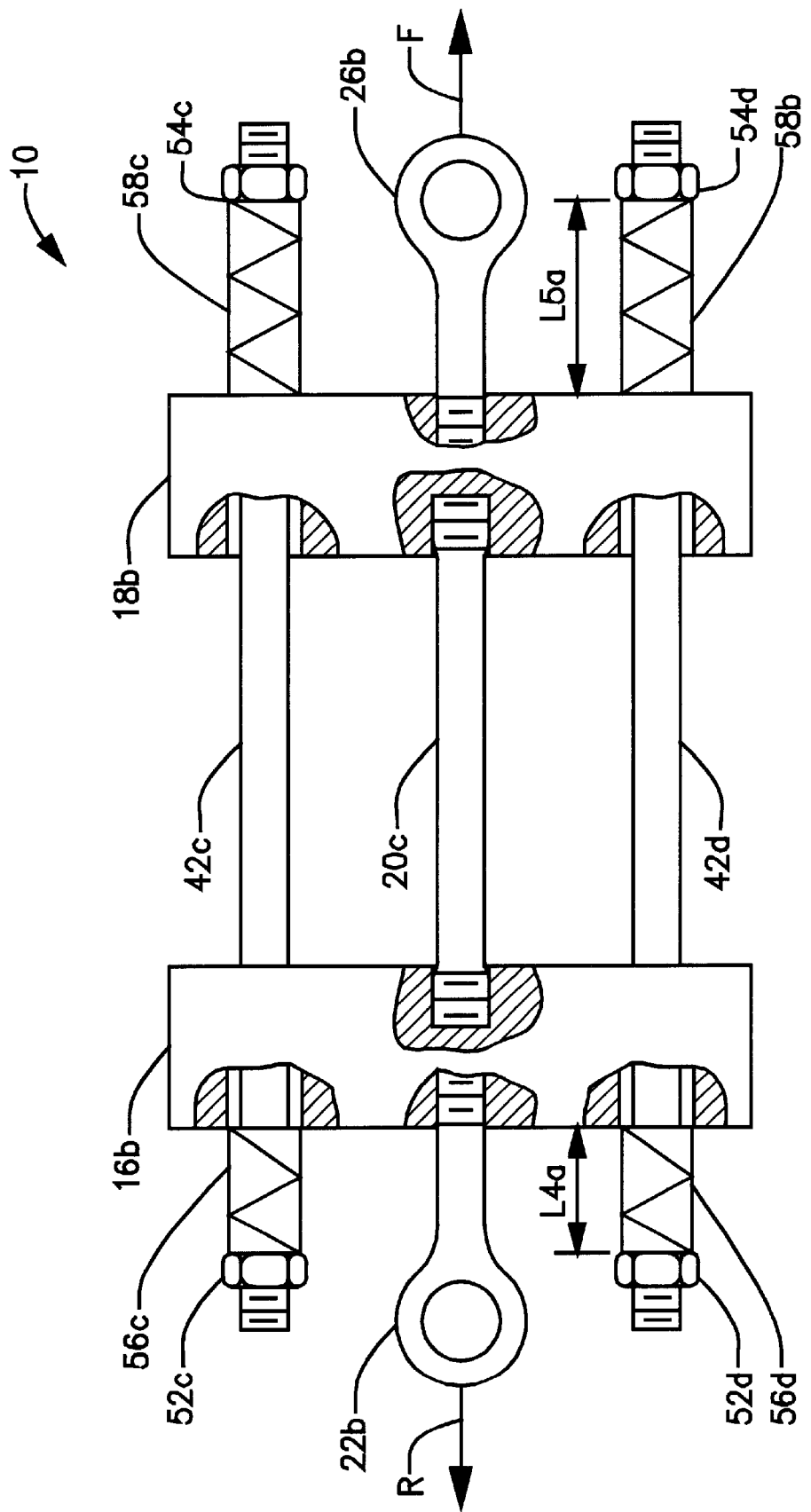
FIG. 5 is a front elevation view, in partial cross section, in which the overload retainer has two beams, and the first and second support plate members are in an underload position.

FIG. 5 shows on alternative embodiment of a device (10c) having features found on the present invention. The device includes attachment fixtures (22b) and (26b) which are connected to support plate members (16b) and (18b) respectively. A tensile member (20c) extends between and is connected to each of the plates to support a predetermined acceptable level of force. An overload retainer comprising two beams (42c) and (42d) is slideably engaged to each of the support plate members and is configured to support forces in excess of the predetermined acceptable level.

Force absorbers (56c) and (56d) are mounted on the beams between the stop members (52c) and (52d) respectively, and first support plate (16b). The stop members (52c) and (52d) are positioned a distance (L4a) from the first support plate (16b) as shown with respect to stop member (52d). Force absorbers (58c) and (58d) are mounted on the beams between the stop members (54c) and (54d), respectively, and second support plate (18b). The stop members (54c) and (54d) are positioned a distance (L5a) from support plate member (18b) as shown with respect to stop member (54d).

Having described the various embodiments with features found on the present invention, the use of the invention will now be described.

The operator can first determine what type of force generator will be used and the type of load upon which the force generator will operate. An overload indicator (10) is selected that includes a tensile member (20) which will fracture or break when it is required to support a predetermined maximum acceptable level of force. For example, the load being moved may be an instrumentation package that should not be subjected to lifting forces in excess of 200 pounds. If so, a tensile member is provided that will support a force of 200 pounds, or to acquire a greater margin of safety, some lesser amount of force, such as 100 pounds. In this example, the overload retainer (40) is made with one or more beams that will support loads in excess of 200 pounds.

If necessary, the tensile member (20) can be removed by unscrewing its ends from the support plate members (16) and (18). A new tensile member can then be installed that has the desired force supporting capability. With respect to the embodiment shown in FIGS. 3 and 4, the tensile member (20b) is removed by unscrewing bolts (68a) and (68b) from the exposed sides (81a) and (81b) of the support plate members. Thus, the tensile member can be removed and replaced without having to disassemble the support plates from the overload retainer.

FIG. 5 shows an embodiment in which a force (F) is applied to attachment fixture (26b). The force can be applied with a force generator as shown in FIG. 1. The force is transmitted into second support plate (18b), through tensile member (20c), first support plate (16b), and into attachment fixture (22b). Attachment fixture (22b) is connected to a load (not shown) that imparts a reactive force (R) to the overload indicator. Typically, forces (F) and (R) will be about equal to each other, but force (F) can be larger than (R) in some cases, such as when the load is being accelerated. Moreover, while the force (F) will normally be supported by tensile member (20c), some fraction of the force may be carried by beams (42d) and (42c) due to frictional contact with the first and second support plates (16b) and (18b).

The embodiment of FIG. 5 is shown in an underload condition. In the underload condition, the force supported by the tensile member (20c) is less than a predetermined acceptable level. This level of force will depend upon the application and the acceptable amounts of force that can be imparted to the force generator and or the load. In the underload condition, the tensile member (20c) supports at least part of the force (F) and the first and second support plates (16b) and (18b) are in the underload position. In their underload positions, first support plate (16b) is positioned distance (L4a) from stop members (52c) and (52d), and second support plate (18b) is positioned distance (L5a) from stop members (54a) and (54b).

The force (F) applied to attachment fixture (26b) may rise to the point that the force supported by tensile member (20c) exceeds the predetermined acceptable amount. This can occur, for example, if the load becomes snagged on an obstruction during movement.

Figure 6:
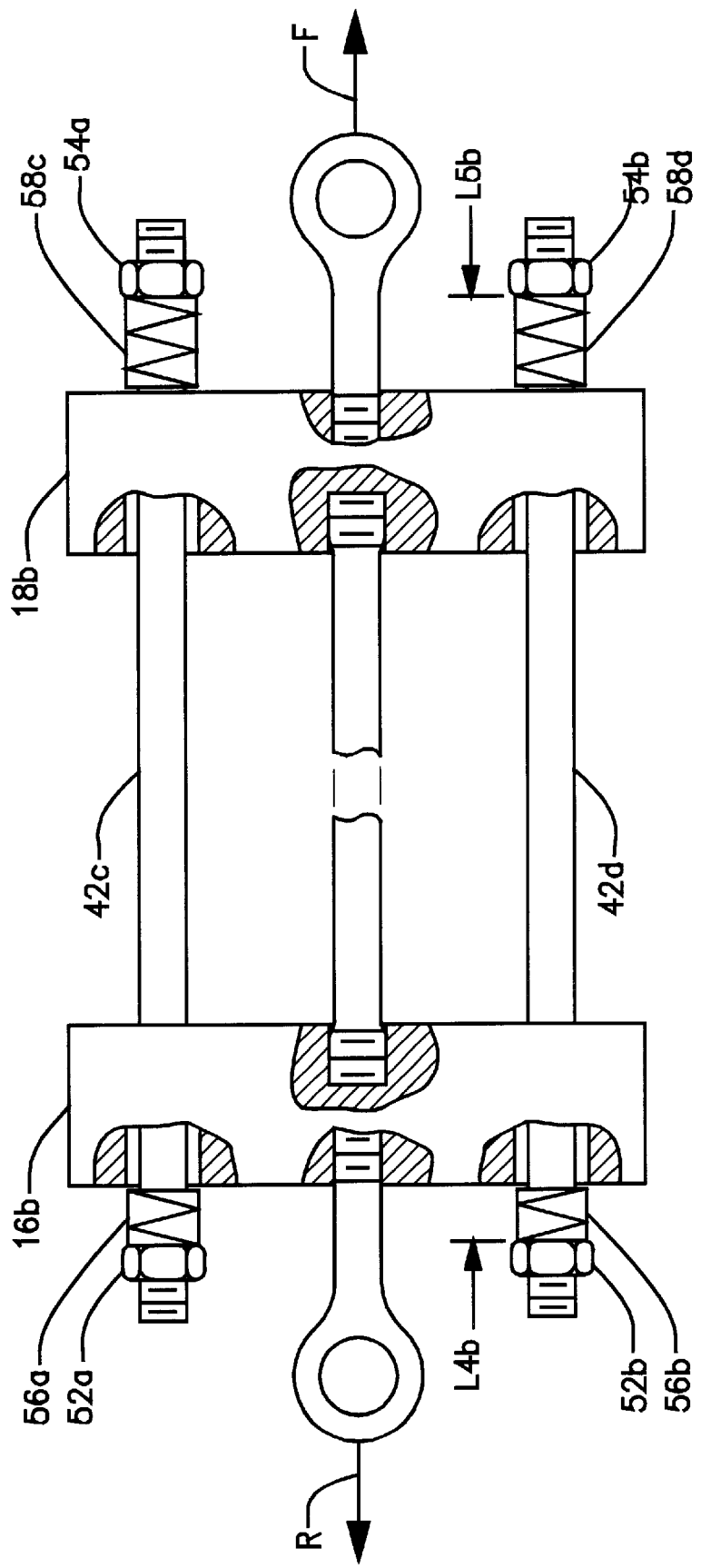
FIG. 6 shows the embodiment of FIG. 5, in which the tensile member is fractured and the first and second support plate members are in an overload position.

FIG. 6 shows the same embodiment of FIG. 5 in an overload condition. An overload condition occurs when the force (F) rises to a level such that the force supported by the tensile member (20c) rises above the predetermined acceptable amount. When this occurs, the tensile member (20c) will fracture and the force (F) will shift to and be supported by beams (42c) and (42d).

When the tensile member (20c) fractures, the first support plate (16b) moves from the underload position to the overload position. In the overload position the first plate is positioned distance (L4b) from stop members (52a) and (52b), and distance (L4b) is shorter than distance (L4a). Moreover, the second support plate (18b) moves from the underload position to the overload position. In the overload position the second plate (18b) is positioned distance (L5b) from stop members (54a) and (54b), and distance (L5b) is shorter than distance (L5a). Thus, the support plate members are closer to the stop members when in the overload position than when in the underload position.

The support plate members bear against and compress force absorbers (56c), (56d), (58c) and (58d) when moving from the underload to overload positions. The force or shock absorbers absorb some of the kinetic energy or impact-forces that would otherwise be imparted to the stop members, thereby reducing the level of the force that would otherwise be imparted to the stop members when the plates move into the overload position.

Embodiments of the invention can include various means for indicating to an operator that an overload condition has occurred. For example, when the force supported by the tensile member exceeds a predetermined acceptable level, the tensile member (20c) can fracture a in a manner that generates a noise, such as a pop, that is audible to the operator. Moreover, the first and second support plates (16b) and (18b) can be constructed wherein the ends of the tensile members pull out of the plates with a similar audible output.

With respect to the embodiment shown in FIG. 3, contact plates (82a) and (82b) in the switch (82) will close when support plate (18a) moves into the overload position, completing the circuit to output device (84). Also, the switch might incorporate a piezo-electric device which is deformed under the pressure from the support plate to power output device.

In the event that an operator hears the audible output, the operator will be altered to the fact that an overload situation had occurred. Consequently, the operator can make adjustments to the force generator to reduce the forces applied to the load.

The overload indication means can also be visual, in addition to or separately from the audible means. For example, switch (82) can be connected to a light or a dial indicator. Additionally, a fractured tensile member will provide visual indication that an overload condition has occurred, as well as the first and second support plate members when they are in their respective overload positions.

Although the invention has been described in detail, with respect to apparatus and method embodying aspects of the invention, it is to be understood that the description is intended by way of illustration and example only, and is not to be taken by way of limitation. Accordingly, the spirit and scope of the invention are to be limited only by the terms at the appended claims.

What is claimed:

1. Overload indicator apparatus for use in connection with a force generator used to apply a force to a load, and for indicating that the force applied to the load is greater than a predetermined amount, comprising:

a. a first support member connectable to at least one of the force generator and the load, and a second support member connectable to at least one of the load and the force generator and spaced away from said first support member;

b. a tensile member connected to said first and said second support members, adapted to support at least part of the force when the force is less than substantially the predetermined amount of force;

c. an overload retainer comprising at least one beam having a first end connected to said first support member and a second end moveably connected to said second support member, said overload retainer adapted to support at least part of the force when the force is greater than substantially the predetermined amount of force; wherein a far end of said second end comprises a stop member, and wherein when the force is less than substantially the predetermined amount of force said second support member is in an underload position, and when the force is greater than substantially the predetermined amount of force said second support member is in an overload position, wherein the second support member is closer to said stop member when in the overload position than when in the underload position.

2. Apparatus as claimed in claim 1, wherein a portion of the apparatus is adapted to break when the force is greater than substantially the predetermined amount of force.

3. Apparatus as claimed in claim 2, wherein said portion comprises said tensile member.

4. Apparatus as claimed in claim 3, wherein said tensile member is removably connected to at least one of said first and said second support members.

5. Apparatus as claimed in claim 4, wherein said tensile member comprises a breakable portion disposed between ends connected with said first and said second support members.

6. Apparatus as claimed in claim 1, comprising a force absorber disposed between said second support member and said stop member.

7. Overload indicator apparatus for use in connection with a force generator used to apply force to a load, and for indicating that the force applied to the load is greater than a predetermined amount, comprising:
   a. a first plate member connectable to at least one of the force generator and the load and moveable between a first underload position and a first overload position, wherein said first plate member is in the first underload position when the force is less than substantially the predetermined amount and is in the first overload position when the force is greater than substantially the predetermined amount;
   b. a second plate member spaced away from said first plate member and connectable to at least one of the load and the force generator, wherein said second plate member is moveable between a second underload position and a second overload position, wherein said second plate member s in the second underload position when the force is less than substantially the predetermined amount and is in the second overload position when the force is greater than substantially the predetermined amount;
   c. a tensile member disposed said first plate member and said second plate member, having a first tensile end connected to said first plate member and a second tensile end connected to said second plate member, said tensile member adapted to support at least part of the force when said first plate member is in the first underload position;
   d. an overload retainer having at least one first end moveably connected to said first plate member and at least one second end connected to said second plate member, said overload retainer adapted to support at least part of the force when said first plate member is in the first overload position, said first end comprising a stop member wherein said first support member is closer to said stop member when in the first overload position than when in the first underload position.

8. Apparatus as claimed in claim 7 comprising a force absorber disposed between said stop member and said first support plate.

9. Apparatus as claimed in claim 8, wherein the apparatus comprises a break portion adapted to break when the force is greater than substantially the predetermined amount.

10. Apparatus as claimed in claim 9, wherein said break portion comprises said tensile member.

11. Apparatus as claimed in claim 10, wherein said tensile member is removably connected to at least one of said first and said second plate members.

12. Apparatus as claimed in claim 11, wherein said tensile member comprises a middle portion disposed said first tensile end and said second tensile end, and said middle portion is adapted to break.

13. Overload indicator apparatus for use in connection with a force generator used to apply force to a load, and for indicating that the force applied to the load is greater than a predetermined amount, comprising:
   a. a first plate member connectable to at least one of the force generator and the load;
   b. a second plate member spaced away from said first plate member and connectable to at least one of the force generator and the load;
   c. a tensile member having a first tensile end connected to said first plate member and a second tensile end connected to said second plate member and adapted to support at least part of the force when the force is less than substantially the predetermined amount;
   d. a first fastener releasably securing said first tensile end to said first plate member, said first fastener being removable from a first exposed side of said first plate member;
   e. a second fastener releasably securing said second tensile end to said second plate member, said second fastener being removable from a second exposed side of said second plate member;
      whereby, when said first fastener and said second fastener are removed, said tensile member can be removed from said first plate member and said second plate member; and
   f. an overload retainer having at least one beam with a first end connected to said first plate member and a second end connected to said second plate member, said overload retainer adapted to support at least part of the force when the force is greater than substantially the predetermined amount of force, said first end having a stop member, wherein said first plate member is closer to said stop member when the force is greater than substantially the predetermined amount than when the force is less than substantially the predetermined amount.

14. Apparatus as claimed in claim 13, wherein said tensile member comprises a weakened portion adapted to break when the force is greater than substantially the predetermined amount of force.

15. Apparatus as claimed in claim 14, wherein said first plate member is slideably connected to said first end and moveable between a first underload position and a first overload position.

16. Apparatus as claimed in claim 13 wherein said second plate member is slideably connected to said second end and moveable between a second underload position and a second overload position.

* * * * *